(12) United States Patent
Suzuki

(10) Patent No.: US 8,089,835 B2
(45) Date of Patent: Jan. 3, 2012

(54) OPTICAL DISC APPARATUS AND TRACKING CONTROL METHOD

(75) Inventor: Motoyuki Suzuki, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/938,502

(22) Filed: Nov. 3, 2010

(65) Prior Publication Data

US 2011/0103205 A1 May 5, 2011

(30) Foreign Application Priority Data

Nov. 4, 2009 (JP) ................................. 2009-252568

(51) Int. Cl.
*G11B 7/00* (2006.01)
(52) U.S. Cl. .................................. 369/44.32; 369/44.29
(58) Field of Classification Search ............... 369/44.32, 369/44.29, 44.35, 44.25, 53.14, 53.19
See application file for complete search history.

(56) References Cited

U.S. PATENT DOCUMENTS

| | | | | |
|---|---|---|---|---|
| 4,744,069 A | * | 5/1988 | Sugiyama et al. | 369/44.29 |
| 5,289,447 A | * | 2/1994 | Kobayashi et al. | 369/44.32 |
| 5,675,562 A | * | 10/1997 | Yanagi | 369/44.28 |
| 5,870,356 A | * | 2/1999 | Ikeda | 369/44.28 |
| 6,449,231 B1 | * | 9/2002 | Numata | 369/53.2 |
| 7,499,382 B2 | * | 3/2009 | Buchler | 369/44.29 |
| 2004/0071054 A1 | * | 4/2004 | Watanabe et al. | 369/44.29 |
| 2008/0304376 A1 | | 12/2008 | Aihara et al. | |
| 2010/0315912 A1 | * | 12/2010 | Takeda | 369/44.32 |

FOREIGN PATENT DOCUMENTS

| | | | |
|---|---|---|---|
| JP | 2007012229 A | * | 1/2007 |
| JP | 2008-299963 | | 12/2008 |

* cited by examiner

*Primary Examiner* — Thang Tran
(74) *Attorney, Agent, or Firm* — Antonelli, Terry, Stout & Kraus, LLP.

(57) ABSTRACT

An optical disc apparatus of the present application has a lens position signal generator for generating a lens position signal representative of a position of an objective lens in a disc radial direction, an amplitude corrector for correcting an amplitude of a tracking error signal, and a tracking controller for generating an actuator drive signal for controlling an actuator, from an output of the amplitude corrector, wherein the amplitude corrector corrects an amplitude of the tracking error signal in accordance with the lens position signal to make approximately constant a tracking error detection sensitivity relative to a displacement between an optical spot and a track.

10 Claims, 7 Drawing Sheets

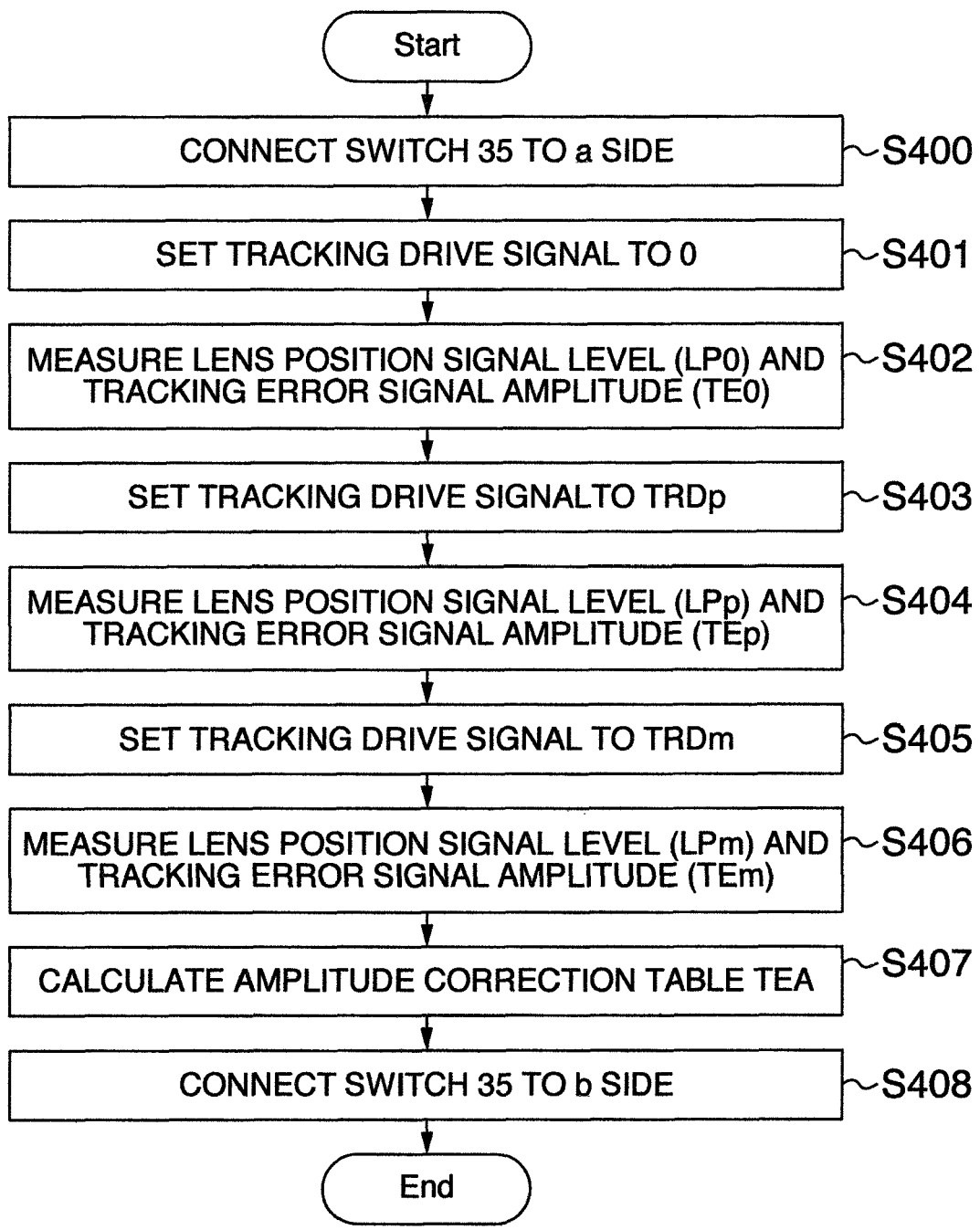

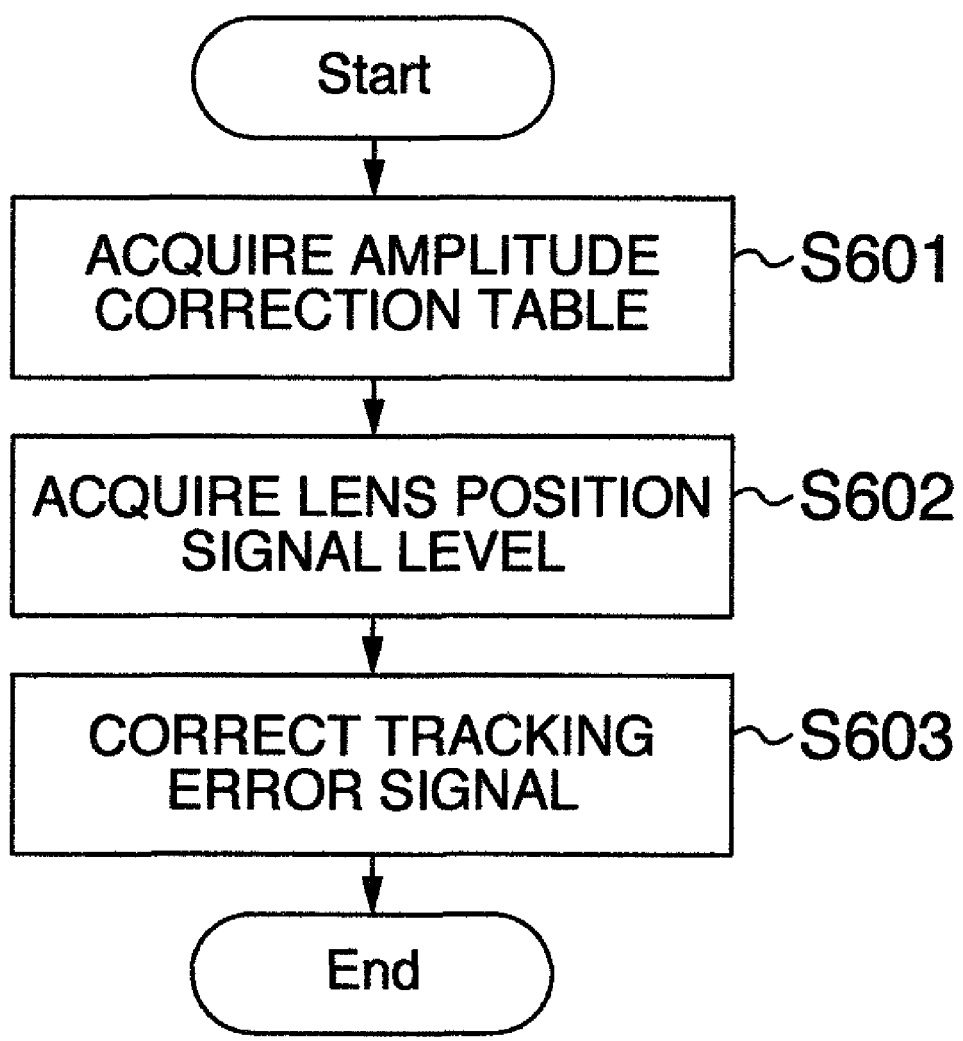

OPTICAL DISC APPARATUS AND TRACKING CONTROL METHOD

INCORPORATION BY REFERENCE

The present application claims priority from Japanese application JP 2009-252568 filed on Nov. 4, 2009, the content of which is hereby incorporated by reference into this application.

BACKGROUND OF THE INVENTION

The present invention relates to an optical disc apparatus and a tracking control method.

One of documents regarding tracking control is JP-A-2008-299963 (Patent Document 1). The background art of this Patent Document 1 describes that "First, track-crossing frequency due to an eccentricity of an optical disc is detected when the tracking servo is turned off; and then the tracking servo is turned on, i.e., track pull-in is performed when the track-crossing frequency reaches the lowest value (i.e., when the track is displaced, due to the eccentricity, at maximum toward the inner circumference side or the outer circumference side of the optical disc) and also when an objective lens is not moved from its neutral position.

Subsequently, a tracking actuator is activated to start tracking control by having the objective lens follow the track and moving the objective lens toward the radial direction of the optical disc. Thereafter, the neutral position of the objective lens is moved to a center position of the track displaced due to the eccentricity of the optical disc by activating a slider based on an average value of a driving signal for the tracking actuator per one revolution of the optical disc.

Then, the tracking control is performed by moving the objective lens to make it follow the track".

SUMMARY OF THE INVENTION

There is a need for making compact, light in weight and thin mobile apparatus such as a note-type personal computer, resulting in a high need for making an optical disk drive (ODD) unit compact, light in weight and thin. In this background, it has been proposed to provide an ODD unit having a thickness of 12.7 mm and a thinner ODD unit thinned even to 9.5 mm almost the same thickness as thinner hard disk drive. (HDD) Thinning these units is realized by using a small diameter objective lens to be mounted on an optical pickup.

As a diameter of the objective lens becomes smaller, a tracking error signal amplitude lowers largely when the objective lens displaces from the neutral position. As a tracking error signal amplitude becomes lower, a sensitivity (tracking error detection sensitivity) for detecting a deviation between an optical spot and a track lowers so that a gain of a tracking control system lowers. In the case of a disc having large eccentricity, therefore, when an objective lens displaces largely from the neutral position after track pull-in, the tacking error signal amplitude lowers largely. There arises therefore a problem that tracking control becomes unstable because of a lowered gain of the tracking control system. This problem is not described in Patent Document 1.

It is an object of the present invention to provide an optical disc apparatus capable of improving stability of tracking control.

It is possible to achieve the above-described issue by applying the constitutions described in claims. The outline of the constitutions will be described in the following.

For example, the optical disc apparatus of the present invention is equipped with a lens position signal generator for generating a lens position signal representative of a position of an objective lens in a disc radial direction and a tracking drive signal generator for generating a tracking drive signal by changing a ratio of the tracking drive signal to the tracking error signal in accordance with the lens position signal.

Further, for example, the optical disc apparatus of the present invention is equipped with an amplitude corrector for correcting the amplitude of the tracking error signal in accordance with the lens position signal to make a tracking error detection sensitivity for a displacement between an optical spot and a track approximately constant.

According to the present invention, it is possible to provide an optical disc apparatus capable of improving stability of tracking control.

Other objects, features and advantages of the invention will become apparent from the following description of the embodiments of the invention taken in conjunction with the accompanying drawings.

BRIEF DESCRIPTION OF THE DRAWINGS

FIG. 4 is a flow chart explaining a gain correction learning process.

FIG. 6 is a flow chart illustrating the operation of an optical disc apparatus of an embodiment.

DETAILED DESCRIPTION OF THE INVENTION

Embodiments of the present invention will now be described with reference to the accompanying drawings.

Figure 1:
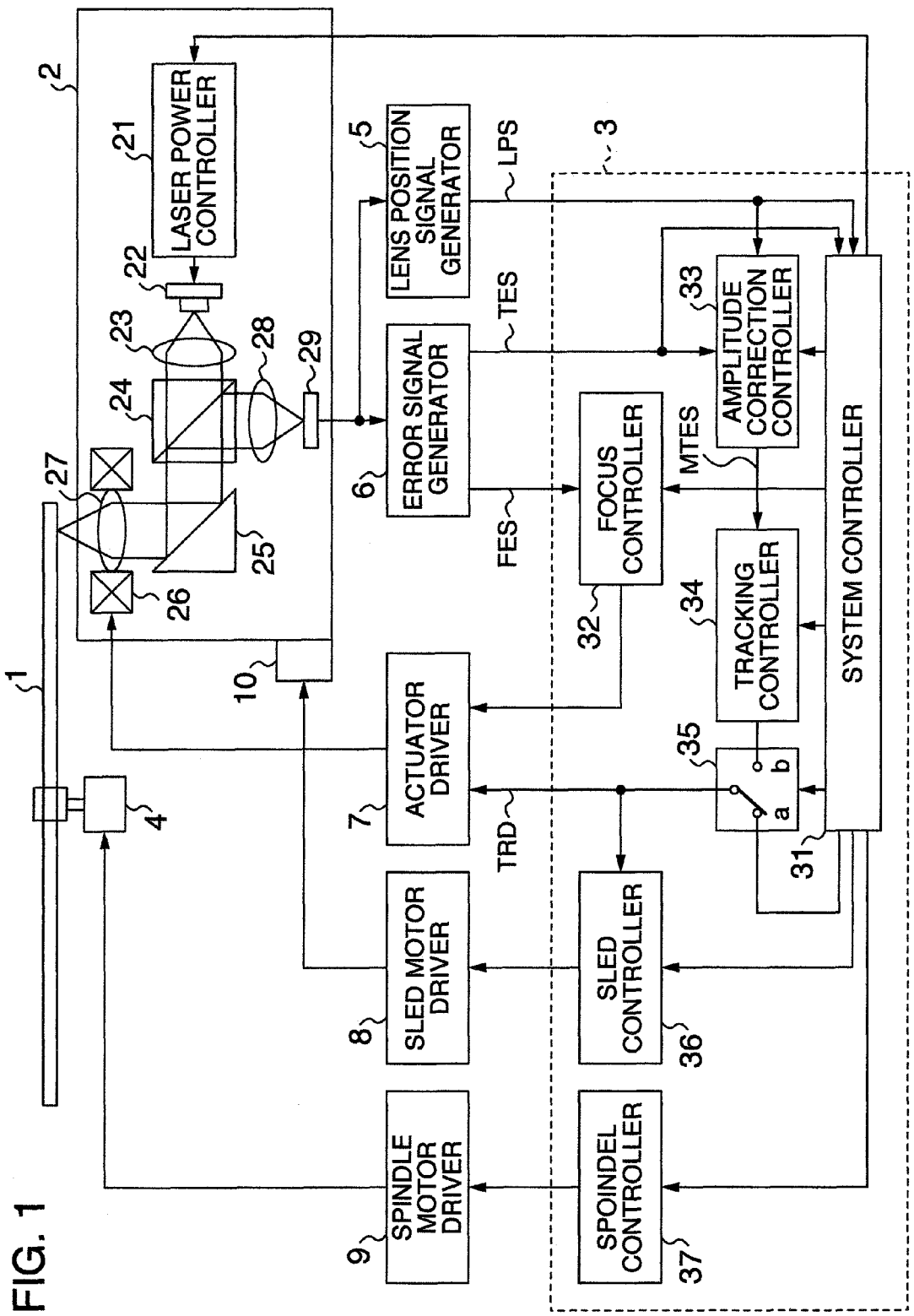
FIG. 1 is a block diagram illustrating the structure of an optical disc apparatus according to an embodiment.

FIG. 1 is a block diagram illustrating the structure of an optical disc apparatus of an embodiment.

An optical disc apparatus may be any type of an optical disc apparatus if the apparatus is able to record, reproduce or record and reproduce data relative to an optical disc. Technical advantages to be described below are demonstrated remarkably if an optical disc apparatus is a so-called slim-type or ultra slim-type optical disc drive, because these drives have a strong need for making an objective lens have a small diameter. It is assumed that a slim-type optical disc drive has a thickness of, e.g., 12.5 mm to 12.9 mm, and an ultra slim-type optical disc drive has a thickness of, e.g., 9.3 mm to 9.7 mm.

An optical disc 1 is rotated at a predetermined rotational speed by a spindle motor 4. The spindle motor 4 is driven by a spindle motor driver 10. The spindle motor driver 10 drives the spindle motor 4 in accordance with a control signal output from a spindle controller 37 receiving a command signal from a system controller 31 mounted on a signal processor 3 for processing various signals of the optical disc apparatus.

A laser source 22 emits a laser beam at a predetermined power in response to a command signal sent from the system controller 31 to a laser power controller 21 mounted on a pickup 2.

A laser beam emitted from the laser source 22 is converged to an information recording plane of the optical disc as an optical spot through a collimator lens 23, a beam splitter 24, a reflection mirror 25, and an objective lens 27.

A laser beam that reflects on the information recording plane of the optical disk 1 diverges by beam splitter 24, and is converged to photo detector 29 by condenser lens 28.

The photo detector 29 converts the converged laser beam into an electric signal to be output to a lens position signal generator 5 and an error signal generator 6.

A focus error signal FES output from the error signal generator 6 is input to a focus controller 32. The focus controller 32 outputs a focus control signal in accordance with the focus error signal FES, in response to a command from the system controller 31.

An actuator driver 7 drives an actuator 26 in a direction perpendicular to a disc plane, in accordance with the focus control signal, the actuator 26 being structured to be moved in unison with the objective lens 26. The actuator driver 7 performs focus control to make an optical spot radiated to the optical disc 1 always be focused on the information recording plane of the disc 1. As the focus control is performed and the optical spot is made in-focus on the information recording plane of the disc 1, the error signal generator 6 outputs a tracking error signal TES. The tracking error signal TES is a signal representative of a position displacement between an optical spot and a track on the information recording plane.

Amplitude of the tracking error signal TES is corrected by an amplitude corrector 33 in accordance with a lens position signal LPS output from the lens position signal generator 5. A corrected tracking error signal MTES is output to a tracking controller 34.

In response to a command signal from the system controller 31, the tracking controller 34 outputs a signal for driving the objective lens 27 in a disc radial direction in accordance with the corrected tracking error signal MTES, to make an optical spot radiated to the optical disc 1 follow the track on the information recording plane. The signal for driving the objective lens 27 in the disc radial direction is input as a tracking drive signal TRD to the actuator driver 7 via a switch 35b.

In accordance with the tracking drive signal TRD, the actuator driver 7 drives the actuator 26 to drive the objective lens 27 in the disc radial direction.

A sled controller 36 outputs a sled drive signal for driving a sled motor 10, in accordance with an average of tracking actuator drive signals TRD output in response to a command signal from the system controller 31.

A sled motor driver 8 drives the sled motor 10 in accordance with the sled drive signal. The optical pickup 2 is moved therefore in the disc radial direction in such a manner that the objective lens 27 operates always near at the neutral position.

The signal processor 3 is a processor constituted of a CPU, an LSI and the like and equipped with the system controller 31, focus controller 32, amplitude corrector 33, tracking controller 34, switch 35, sled controller 36, and spindle controller 37.

Description will be made next on a tracking control method applied to the optical disc apparatus constructed as above.

Figure 2:
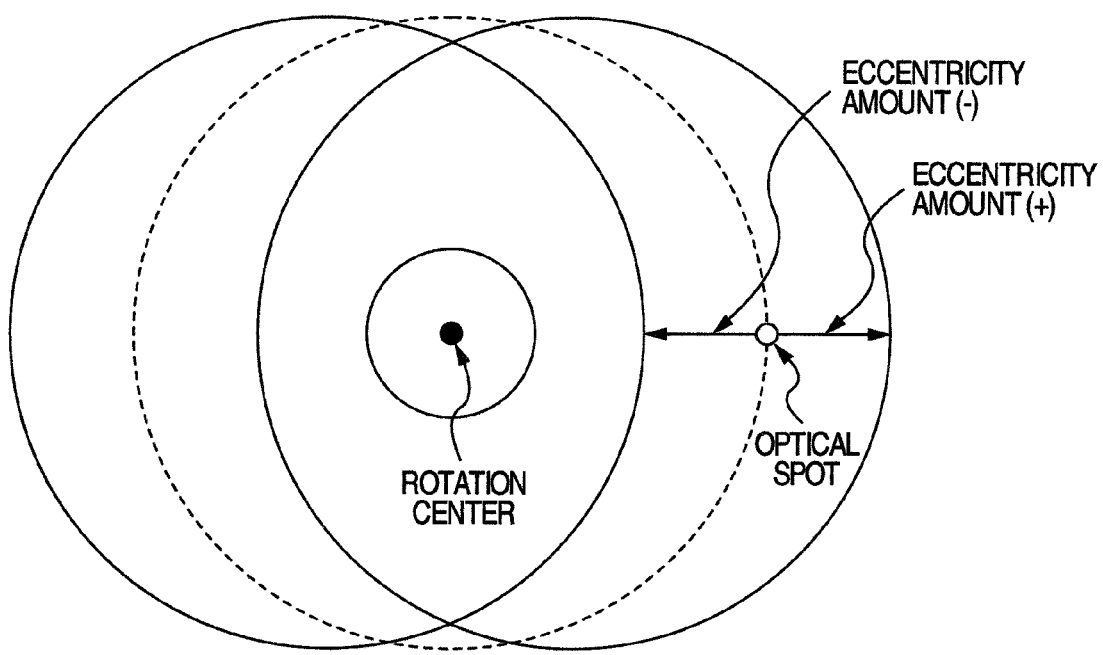
FIG. 2 is a conceptual diagram explaining an eccentricity amount of an optical disc.

First, with reference to FIG. 2, description will be made on an "eccentricity amount" of the optical disc 1.

In this embodiment, an eccentricity amount of the optical disc 1 is a degree of eccentricity of a rotation center of the optical disc 1. As illustrated in FIG. 2, the "eccentricity amount" corresponds to a displacement amount of the optical disc (track) relative to an optical spot, and it is possible to measure an "eccentricity amount" as a displacement amount of the optical disc 1 (track) when the optical disc 1 rotates a half revolution. As the optical disc 1 rotates one revolution, an "eccentricity amount (eccentricity amount (+))" in an outer circumference direction and an "eccentricity amount (eccentricity amount (−))" in an inner circumference direction appear, and these amounts may be considered to have the same size.

Figure 3:
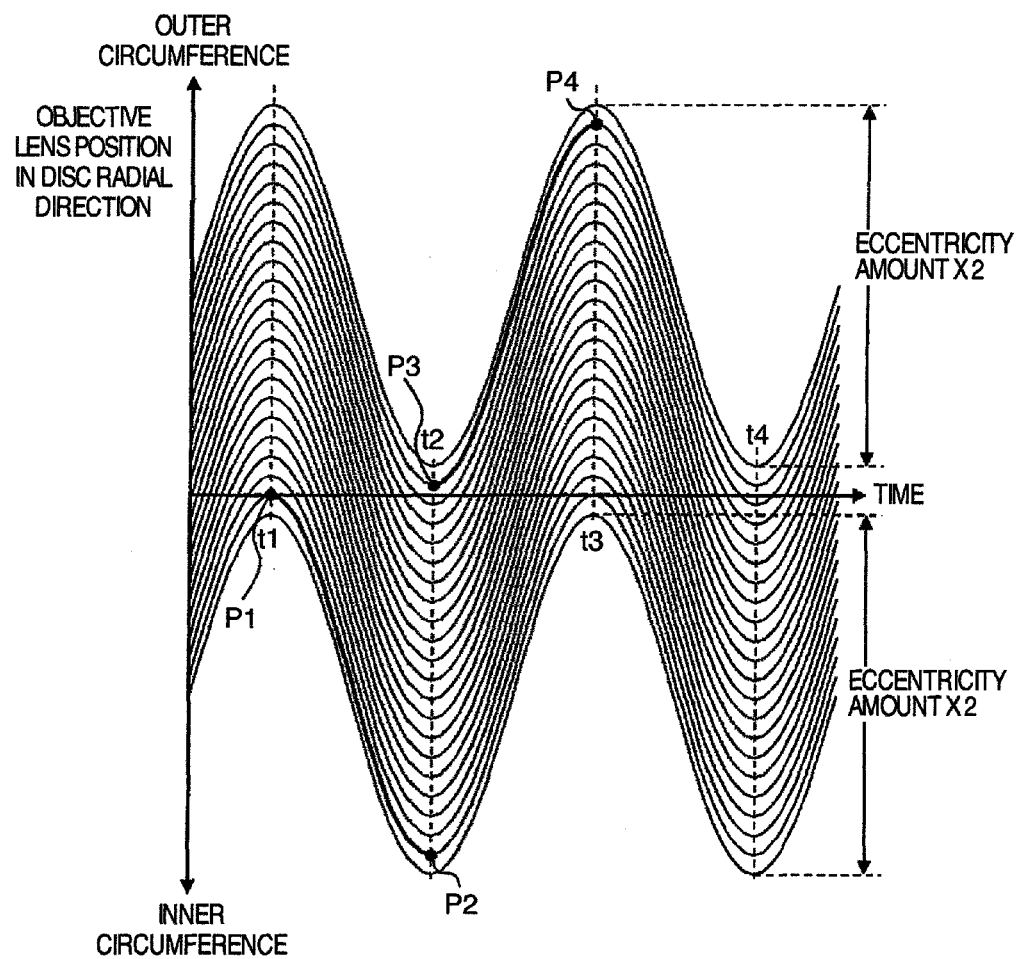
FIG. 3 illustrates waveforms explaining a temporal displacement of a track due to eccentricity of an optical disc.

FIG. 3 illustrates waveforms indicating a temporal displacement of a track to be caused by eccentricity of an optical disc. More specifically, FIG. 3 illustrates a relation between a time (x axis) and a position (y axis) of each track of the optical disc 1 as viewed from the optical pickup 2 positioned facing the optical pickup 1 while the eccentric optical disc 1 is rotated in a state that tracking control is turned off.

The tracking controller 34 detects a frequency of a tracking error signal due to eccentricity of the optical disc 1 in the state that tracking control is turned off. The tracking controller 34 performs so-called track pull-in to turn on tracking control at a timing when the frequency of a tracking error signal becomes lowest and in a state that the objective lens is not displaced from a neutral position. The timing when the frequency of a tracking error signal becomes lowest means, for example, a timing when the track displaces maximum on an inner or outer circumference side of the optical disc due to eccentricity. "When the frequency of a tracking error signal becomes lowest" means when the frequency of a tracking error signal becomes lowest in an ever-measurable range. Not a lowest value but a local minimum value may be used. "The timing when the frequency of a tracking error signal becomes lowest" may be a timing when the frequency of a tracking error signal becomes lower than a predetermined threshold value. The predetermined threshold value may be a value higher by 5% than an anticipated lowest frequency, although it is not intended to be limited to this value. The optical disc apparatus may acquire a track pull-in timing by using a differential value of the frequency of a tracking error signal.

As illustrated in FIG. 3, if the optical disc 1 is eccentric, a track has a displacement corresponding to an eccentricity amount of the optical disc 1 at one revolution period of the optical disc. If track pull-in is performed at timings (time t1, t2, . . . ) when the track displaces maximum due to eccentricity, the pulled-in track displaces therefore to the position spaced by twice the eccentricity amount of the optical disc 1 after a half revolution of the optical disc 1.

Under the above-described conditions, the optical disc apparatus drives the sled motor 10 after the track pull-in in accordance with an average of actuator drive signals during one revolution of the optical disc 1 to thereby move the neutral position of the objective lens 27 to the neutral position of a track displacement due to eccentricity of the optical disc. In FIG. 3, P1 and P3 represent points where track pull-in is performed, and P2 and P4 represent the positions of the points P1 and P3 after a half revolution of the optical disc 1.

Description will be made next on an amplitude correction amount learning process by the amplitude corrector 33, with reference to FIGS. 4, 5A to 5D, and 7.

Figure 7:
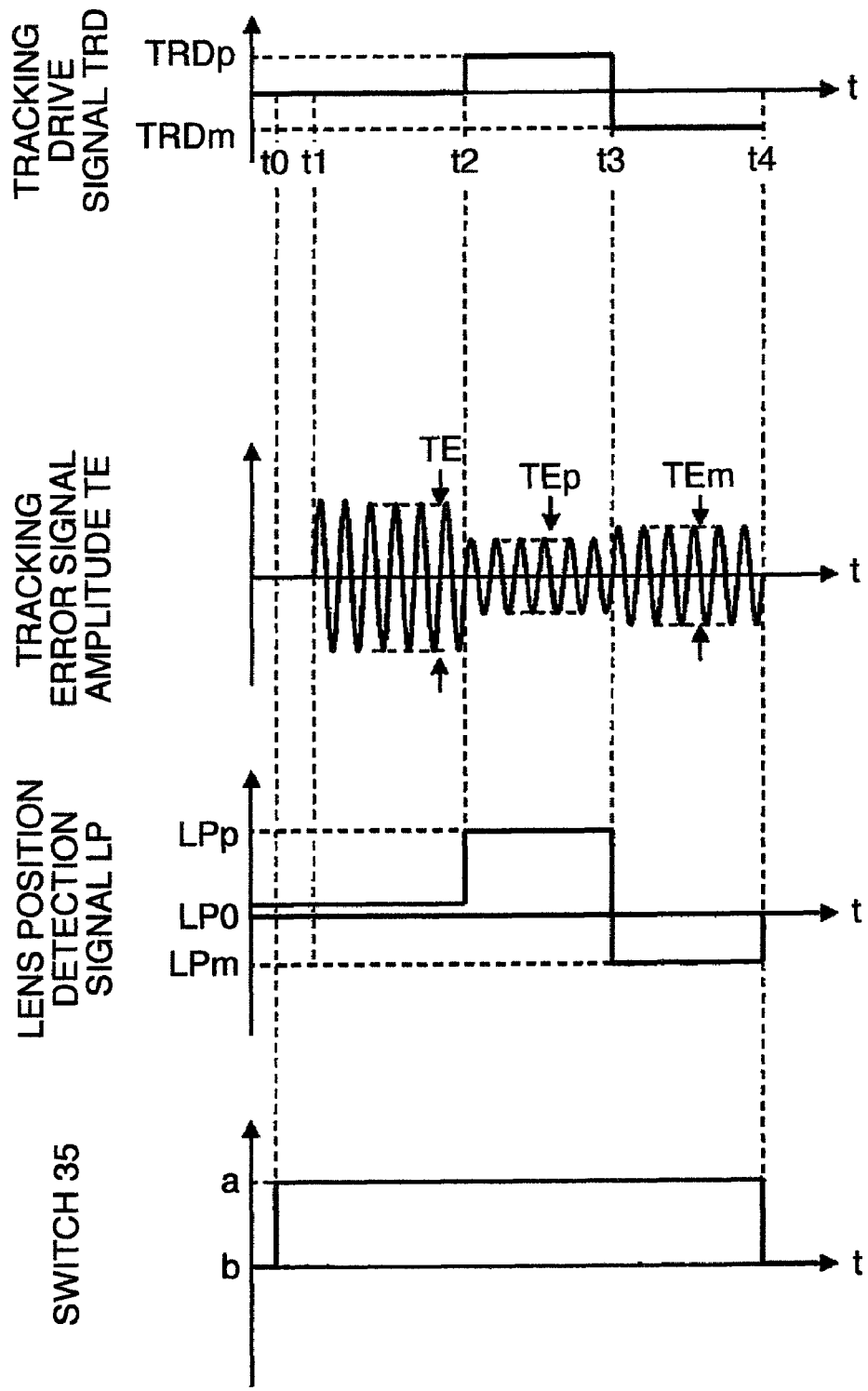
FIG. 7 is a diagram illustrating signal waveforms output from each unit of an optical disc apparatus.

FIG. 4 is a flow chart illustrating an amplitude correction amount learning process. FIG. 7 illustrates waveforms at units in FIG. 1 corresponding to the flow chart in FIG. 4.

First, the optical disc apparatus makes the switch 35 connect an a side (S400, time t0 in FIG. 7) to select a signal output from the system controller 31.

Next, the optical disc apparatus makes the system controller 31 output "0" as the actuator drive signal TRD not to drive the actuator 26, i.e., to set the objective lens 27 to a neutral position (S401, time t1 in FIG. 7).

Next, the system controller 31 measures a signal level LP0 of the lens position signal LPS in the state that the objective lens is at the neutral position, and an amplitude TE0 of the tracking error signal TES (S402).

Next, the optical disc apparatus sets the actuator drive signal TRD to a predetermined set value TRDp to displace the actuator 26 by a predetermined amount in a predetermined radial direction (S403, time t2 in FIG. 7). As a result, it enters the state that objective lens 27 is displaced from a neutral position.

Next, in this state, the system controller 31 measures a signal level LPp of the lens position signal LPS and an amplitude TEp of the tracking error signal TES (S404).

Next, the optical disc apparatus displaces the actuator by a predetermined amount in a radial direction different from that at S403 and S404 (S405, time t3 in FIG. 7). At S405, the actuator drive signal TRD is set to a predetermined set value TRDm having a different polarity from that set at S403. This set value TRDm makes the objective lens 27 enter the positional state displaced from the neutral position in a radial direction different from that at S403 and S404.

Next, the optical disc apparatus makes the system controller 31 measure a level LPm of the lens position signal LPS in this state and an amplitude TEm of the tracking error signal TES (S406).

Next, in accordance with the signal levels of the lens position signal LPS and the amplitudes of the tracking error signal TES measured at S402, S404 and S406, the optical disc apparatus obtains a relation between the signal level of the lens position signal LPS and a tracking error signal amplitude correction amount TEA. By using the obtained correction amounts, the optical disc apparatus sets a correction table of the amplitude corrector 33 (S407). Although the correction table is set at S407, the information to be set may be different from a table format if the information is information representative of a correspondence between the signal levels of the lens position signal LPS and the tracking error signal amplitude correction amounts TEA.

Next, the switch 35 is connect to a b side to make an output of the tracking controller 34 be input to the actuator driver 7 as the tracking drive signal TRD (S408, time t4 in FIG. 7).

Next, description will be made on an operation of the amplitude corrector with reference to FIGS. 5A to 5D.

Figure 5A:
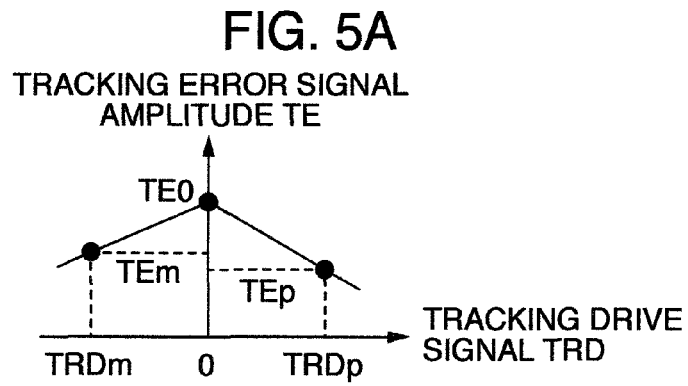
FIGS. 5A to 5D illustrate waveforms explaining the effects of a tracking control method according to an embodiment.

FIG. 5A illustrates a relation between the tracking drive signal TRD and tracking error signal TES. In FIG. 5A, a tracking error signal amplitude TE0 is a tracking error signal amplitude when the tracking drive signal TRD is set to "0" at Step S401 in FIG. 4, i.e., when the objective lens 106 is set to the neutral position. In contrast, as the tracking drive signal TRD is set to TRDp and TRDm at Steps S403 and S405 in FIG. 4 respectively, i.e., when the objective lens 27 is displaced from the neutral position, the tracking error signal amplitude lowers to TEp and TEm respectively.

Figure 5B:
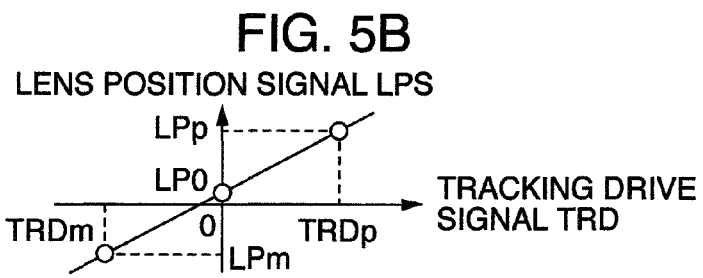

FIG. 5B illustrates a relation between the tracking drive signal TRD and lens position signal LPS. FIG. 5B illustrates that the lens position signal LPS is output in proportion to a set value of the tracking drive signal TRD, i.e., a position of the objective lens 27. It is understood from the relations in FIGS. 5A and 5B that the relation between the lens position signal LPS and tracking error signal amplitude TE is given by the following formula (1):

$$TE = TE0 - \frac{TE0 - TEp}{LPp - LP0} \cdot (Lp - LP0) \quad (LP >= LP0)$$

-continued
$$= TE0 - \frac{TE0 - TEm}{LPm - LP0} \cdot (Lp - LP0) \quad (LP < LP0)$$

The amplitude correction amount TEA relative to the lens position signal LPS is given by the following formula (2):

$$TEA = \frac{TE0}{TE0 - \frac{TE0 - TEp}{LPp - LP0} \cdot (Lp - LP0)} \quad (LP >= LP0)$$

$$= \frac{TE0}{TE0 - \frac{TE0 - TEm}{LPm - LP0} \cdot (Lp - LP0)} \quad (LP < LP0)$$

Figure 5C:
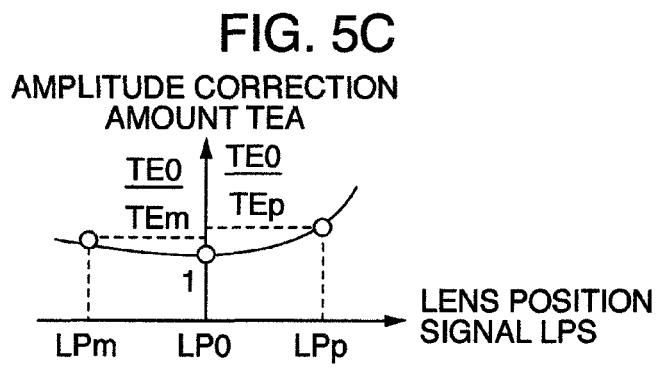

FIG. 5C illustrates a relation between the lens position signal LPS and amplitude correction amount TEA of the formula (2). In FIG. 5C, at the neutral position of the objective lens 27, the amplitude correction amount TEA=1 at the lens position signal of LP0. In FIG. 5C, as the objective lens 27 displaces from the neutral position, the amplitude correction amount TEA=TE0/TEp at the lens position signal of LPp. In FIG. 5C, the amplitude correction amount TEA=TE0/TEm at the lens position signal of LPm.

Figure 5D:
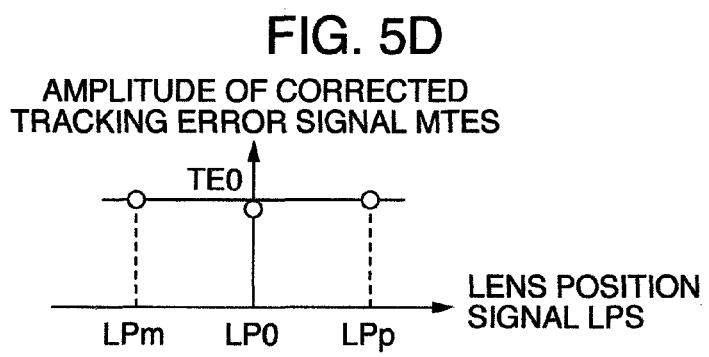

FIG. 5D illustrates a relation between the lens position signal LPS and the corrected tracking error signal MTES output from the amplitude corrector 33. FIG. 5D illustrates that an input tracking error signal amplitude TE is output being corrected by the amplitude correction amount TEA. For example, if the lens position signal is LP0, i.e., if the objective lens 27 is at the neutral position, the amplitude corrector 33 outputs the corrected tracking error signal MTES having an amplitude of TE0×TEA=TE0×1=TE0. If the lens position signal is LPp, i.e., if the objective lens 27 displaces from the neutral position, the amplitude corrector 33 outputs the corrected tracking error signal MTES having an amplitude of TEp×TEA=TEp×TE0/TEp=TE0. Even if the objective lens 27 displaces from the neutral position, an amplitude of the corrected tracking error signal MTES output from the amplitude corrector 33 is, therefore, always approximately constant. It is needless to say that an approximately constant amplitude of the tracking error signal is obtained while the optical disc apparatus does not perform tracking servo control.

An output level of the tracking drive signal TRD has a value proportional to an output level of the corrected tracking error signal MTES. It is understood from FIGS. 5C and 5D that an amplitude ratio between the tracking error signal TES and corrected tracking error signal MTES changes with the lens position signal LPS. More specifically, the larger the displacement of the objective lens 27 from the neutral position is and the larger a change in the lens position signal LPS relative to the neutral position is, an amplitude ratio between the tracking error signal TES and corrected tracking error signal MTES becomes large. It is understood from these points that the larger a displacement of the position of the objective lens 27 from the neutral position is and the larger a change in the lens position signal LPS relative to the neutral position is, the signal processor 3 of the optical disc apparatus makes larger the ratio between the tracking error signal TES and the output level of the tracking drive signal TRD.

As illustrated in FIG. 5D, if tracking control is not performed and correction by the amplitude corrector 33 is not made, an amplitude of the tracking drive signal to be output from the signal processor 3 becomes constant.

In other words, the processes illustrated in FIGS. 5A to 5D correspond to that the optical disc apparatus, signal processor 3 or amplitude corrector 33 corrects an amplitude of the tracking error signal in accordance with the lens position signal to make approximately constant a tracking error detection sensitivity for a displacement between an optical spot and a track.

Next, with reference to the flow chart in FIG. 6, description will be made on the amplitude correction process of the optical disc apparatus.

First, the optical disc apparatus acquires the correction table obtained at S407 in FIG. 4 (S601). Next, the optical disc apparatus acquires the lens position signal LPS (S602). Next, in accordance with the acquired correction table and lens position signal LPS, the optical disc apparatus acquires the amplitude correction amount TEA, and corrects an amplitude of the tracking error signal TES (S603). At S603, the optical disc apparatus sets a higher ratio of an output level of the tracking drive signal TRD to the tracking error signal TES in later tracking control, the larger a change in the lens position signal relative to the neutral position becomes.

In the above-described amplitude correction amount learning process of the embodiment, an amplitude correction amount is obtained by measuring the amplitudes of the lens position signal LPS and tracking error signal TES by setting three points of the tracking drive signal TRD. The present invention is not limited only to this process, but an amplitude correction amount may be obtained by measuring the amplitudes of the lens position signal LPS and tracking error signal TES by setting a large number of points of the tracking drive signal TRD. An amplitude relation between the tracking error signal TES and lens position signal LPS is obtained as a straight line. The relation is not limited only to a straight line, but it is apparent that a quadratic curve or the like may also be used to perform a process matching the characteristics of an optical system.

Although the lens position signal LPS is obtained from a laser beam reflected from the optical disc 1, the lens position signal may be obtained by a detector for directly detecting a position of the objective lens 27.

In the embodiments, although an amplitude is corrected by obtaining an amplitude relation between the lens position signal LPS and tracking error signal TES, similarly an offset may be corrected by obtaining an offset relation between the lens position signal LPS and tracking error signal TES. Alternatively, an amplitude and an offset may be corrected by obtaining an amplitude and offset relation between the lens position signal LPS and tracking error signal TES.

As described so far, the optical disc apparatus and tracking control method of the present invention allow tracking control to be performed stably.

Specifically, the optical disc apparatus or tracking control method of the present invention is able to improve a precision of correcting an amplitude difference between a tracking error signal when the objective lens displaces and a tracking error signal when the objective lens is at the neutral position, even if the objective lens has a smaller diameter than a conventional one.

Further, the optical disc apparatus or tracking control method of the present invention is able to make an objective lens and an optical pickup compact and light in weight while tracking control stability is maintained. An objective lens and an optical pickup compact and light in weight contribute to cost-down.

In the above description, although tracking control has been described mainly, the optical disc apparatus of the present invention is also applicable to focus control. As an objective lens displaces largely from a neutral position, a focus error signal may be degraded. To settle this, the optical disc apparatus makes a focus drive signal generator perform the following process. The focus drive signal generator may be structured in such a way that a ratio of a focus drive signal to a focus error signal is changed with a lens position signal. It is therefore possible to suppress the influence that an objective lens displaces largely from the neutral position due to eccentricity, also in a focus direction, allowing stable focus control.

The present invention is not limited only to the above-described embodiments, but various modifications are possible. For example, the above-described embodiments have been described in detail in order to make it easy to understand the present invention, and the invention is not necessarily intended to be limited to all of the constitutions described. Further, some of the constitutions of one embodiment may be replaced with the constitutions of another embodiment, and constitutions of an embodiment may be added to constitutions of another embodiment. Some of constitutions of each embodiment may be added to, deleted from and replaced with other constitutions.

Further, some or the whole of the above-described constitutions may be structured by hardware, or structured being realized by making a processor execute a program. Control lines and information lines considered to be necessary for description are shown, and it is not always true that all control lines and information lines necessary for each product are shown. It may be considered actually that almost all constitutions are interconnected.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc apparatus for recording or reproducing information relative to an optical disc, comprising:
  a laser source for emitting a laser beam;
  an objective lens for converging said laser beam on an optical disc;
  an actuator for driving said objective lens;
  a photo detector for outputting an electric signal corresponding to a reflected light amount from said optical disc;
  a tracking signal generator for generating a tracking error signal representative of a displacement between said laser beam converged on said optical disc and a track of said optical disc, from an output signal from said photo detector;
  a lens position signal generator for generating a lens position signal representative of a position of said objective lens in a disc radial direction; and
  a tracking drive signal generator for generating a tracking drive signal to be input to said actuator, in accordance with said tracking error signal,
  wherein said tracking drive signal generator generates said tracking drive signal by changing a ratio of said tracking drive signal to said tracking error signal in accordance with said lens position signal.

2. The optical disc apparatus according to claim 1, wherein said tracking drive signal generator generates said tracking drive signal by setting larger ratio of said tracking drive signal to said tracking error signal, as a position of said objective lens becomes more spaced apart from a predetermined neutral position.

3. The optical disc apparatus according to claim 1, further comprising an amplitude corrector for correcting an amplitude of said tracking error signal in accordance with said lens position signal, wherein said tracking drive signal generator generates said tracking drive signal in accordance with said tracking error signal corrected by said amplitude corrector.

4. The optical disc apparatus according to claim 3, wherein said amplitude corrector acquires a correction amount of an amplitude of said tracking error signal corresponding to said lens position signal in accordance with said lens position signals and amplitudes of said tracking error signals at a plurality of displacement positions.

5. The optical disc apparatus according to claim 3, wherein said amplitude corrector corrects an amplitude of said tracking error signal so as to make a tracking error detection sensitivity approximately constant in accordance with said lens position signal.

6. A tracking control method for an optical disc apparatus, comprising steps of:
converging a laser beam emitted from a laser source on an optical disc by an objective lens;
detecting a tracking error signal in accordance with a reflected laser beam from said optical disc;
detecting a position of said objective lens; and
generating a tracking drive signal to be input to an actuator, in accordance with said tracking error signal,
wherein in said step of generating said tracking drive signal, a ratio of said tracking drive signal to said tracking error signal is changed in accordance with a position of said objective lens.

7. The tracking control method according to claim 6, wherein in said step of generating said tracking drive signal, a ratio of said tracking drive signal to said tracking error signal is set larger, as a position of said objective lens becomes more spaced apart from a predetermined neutral position.

8. The tracking control method according to claim 6, further comprising a step of correcting an amplitude of said tracking error signal in accordance with a position of said objective lens, wherein in said step of generating said tracking drive signal, said tracking drive signal is generated in accordance with said corrected tracking error signal.

9. The tracking control method according to claim 8, wherein in said step of correcting an amplitude of said tracking error signal, a correction amount of an amplitude of said tracking error signal corresponding to said lens position signal is acquired in accordance with said lens position signals and amplitudes of said tracking error signals at a plurality of displacement positions.

10. The tracking control method according to claim 8, wherein in said step of correcting an amplitude of said tracking error signal, an amplitude of said tracking error signal is corrected so as to make a tracking error detection sensitivity approximately constant in accordance with said lens position signal.

* * * * *